US012646659B2

(12) United States Patent
Hong et al.

(10) Patent No.: US 12,646,659 B2
(45) Date of Patent: Jun. 2, 2026

(54) METAL FOAM CAPACITORS AND SUPERCAPACITORS

(71) Applicant: CellMo Materials Innovation, Inc., Berkeley, CA (US)

(72) Inventors: Kicheol Hong, Busan (KR); Gigap Han, Chungcheongnam-do (KR); Hyeji Park, Seoul (KR); Balamurugan Thirumalraj, Seoul (KR); Jin Soo Kang, Seoul (KR); Hyeseon Na, Seoul (KR); Youngseok Song, Jeollabuk-do (KR); Heeman Choe, Conroe, TX (US)

(73) Assignee: CellMo Materials Innovation, Inc., Conroe, TX (US)

( * ) Notice: Subject to any disclaimer, the term of this patent is extended or adjusted under 35 U.S.C. 154(b) by 0 days.

(21) Appl. No.: 17/441,156

(22) PCT Filed: Mar. 24, 2020

(86) PCT No.: PCT/US2020/024503
§ 371 (c)(1),
(2) Date: Sep. 20, 2021

(87) PCT Pub. No.: WO2020/198251
PCT Pub. Date: Oct. 1, 2020

(65) Prior Publication Data
US 2022/0165510 A1 May 26, 2022

Related U.S. Application Data

(60) Provisional application No. 62/823,595, filed on Mar. 25, 2019.

(51) Int. Cl.
*H01G 11/36* (2013.01)
*H01G 11/24* (2013.01)
(Continued)

(52) U.S. Cl.
CPC ............. *H01G 11/36* (2013.01); *H01G 11/24* (2013.01); *H01G 11/46* (2013.01); *H01G 11/86* (2013.01)

(58) Field of Classification Search
CPC ........ H01G 11/36; H01G 11/24; H01G 11/46; H01G 11/86
(Continued)

(56) References Cited

U.S. PATENT DOCUMENTS

2005/0213286 A1    9/2005  Michel et al.
2011/0206992 A1*   8/2011  Campbell ............. H01M 4/661
                                                            264/109
(Continued)

FOREIGN PATENT DOCUMENTS

CN        104538205 A  *  4/2015  ............. H01G 11/86
CN        106910637 A  *  6/2017
(Continued)

OTHER PUBLICATIONS

Extended European Search Report for European Patent Application No. 20776588.4 dated Nov. 15, 2022, 12 pages.
(Continued)

*Primary Examiner* — Arun Ramaswamy
(74) *Attorney, Agent, or Firm* — Aka Chan LLP

(57) ABSTRACT

A capacitor and supercapacitor design are based on metal-foam electrodes. An electrolytic capacitor has a metal foam dielectric (e.g., aluminum oxide, titanium oxide, iron oxide, or others). An electric double-layer supercapacitor has an electrode with metal foam (e.g., copper, nickel, titanium, iron, steel alloy, or aluminum) filled with activated carbon, or graphene, or metal foam with activated carbon foam, or any combination of these to enhance the electrical conductivity and thus the power and capacity of the cell. A pseudocapacitor device has an electrode with metal foam
(Continued)

ELECTROLYTE
SEPARATOR
STEEL CASE
ANODE
(METAL-FOAM CURRENT COLLECTOR + METAL OXIDE COATING)
CATION
ANION
CATHODE
(METAL-FOAM CURRENT COLLECTOR + METAL OXIDE COATING)

(e.g., iron, cobalt, nickel, copper, titanium, aluminum, magnesium, tin, manganese, and stainless steel, and their alloy foams) coated with an oxide- or hydroxide-based material containing highly active zones. The pseudocapacitor metal-foam electrode can also be filled with activated carbon in the form of a slurry to further enhance its capacity.

19 Claims, 5 Drawing Sheets

(51) Int. Cl.
H01G 11/46 (2013.01)
H01G 11/86 (2013.01)
(58) Field of Classification Search
USPC .................................. 361/502, 503, 508, 516
See application file for complete search history.

(56) References Cited

U.S. PATENT DOCUMENTS

| | | | |
|---|---|---|---|
| 2012/0082873 A1 | 4/2012 | Fischel | |
| 2012/0087061 A1* | 4/2012 | Thompson ............. | H01G 9/042 |
| | | | 29/25.03 |
| 2012/0183804 A1* | 7/2012 | Kimura .................... | C25D 3/66 |
| | | | 427/226 |
| 2012/0315540 A1 | 12/2012 | Hosoe et al. | |
| 2013/0171502 A1 | 7/2013 | Chen et al. | |
| 2014/0177136 A1* | 6/2014 | Kim ...................... | C01B 32/342 |
| | | | 423/460 |
| 2015/0364789 A1 | 12/2015 | Ogawa et al. | |
| 2017/0025683 A1 | 1/2017 | Park et al. | |
| 2017/0062143 A1 | 3/2017 | Zhamu et al. | |
| 2017/0148573 A1 | 5/2017 | Zhamu et al. | |
| 2017/0221643 A1* | 8/2017 | Zhamu ................... | H01G 11/44 |

FOREIGN PATENT DOCUMENTS

| | | | | |
|---|---|---|---|---|
| CN | 107275105 A1 | 10/2017 | | |
| CN | 107297501 A | 10/2017 | | |
| CN | 108140485 A1 | 6/2018 | | |
| CN | 108172407 A * | 6/2018 | ............. | H01G 11/24 |
| JP | 2002-134367 A | 5/2002 | | |
| JP | 2004303678 A | 10/2004 | | |
| JP | 2013-235680 A | 11/2013 | | |
| JP | 2015-537370 A | 12/2015 | | |
| JP | 2016-111245 A | 6/2016 | | |
| WO | 2014/118547 A1 | 8/2014 | | |
| WO | 2019/035745 A1 | 2/2019 | | |
| WO | 2019/054804 A1 | 3/2019 | | |

OTHER PUBLICATIONS

Wu, Shuxing et al., Ultrathin porous NiO nanoflake arrays on nickel foam as an advanced electrode for high performance asymmetric supercapacitors, Journal of Materials Chemistry A, May 9, 2016, pp. 9113-9123, The Royal Society of Chemistry 2016.

Cui, Chunyu et al., Growth of NiCo2O4@MnMoO4 Nanocolumn Arrays with Superior Pseudocapacitor Properties, ACS Applied Materials & Interfaces, Mar. 15, 2016, pp. 8568-8575, 8, 2016 American Chemical Society.

International Search Report, PCT Application PCT/US2020/024503, Jul. 13, 2020, 7 pages.

Liu, D., et al., "Preparation of 3D nanoporous copper-supported cuprous oxide for high-performance lithium ion battery anodes", Nanoscale, vol. 5, No. 5, Jan. 1, 2013.

European Examination Report dated Mar. 4, 2024 for European Patent Application 20776588.4, 8 pages.

* cited by examiner

FIG. 1A                                    FIG. 1B

WINDING WITH MULTIPLE CONTACTS

ANODE FOIL (ETCHED)
CATHODE FOIL
PAPER SPACER

ELECTROLYTE
CATHODE FOIL
AIR BASED OXIDE LAYER
ON THE CATHODE FOIL

ROUGHENED
ANODE FOIL
DIELECTRIC
(Al2O3)
PAPER
SPACER 100 nm
50 nm

FILLED WITH
ACTIVATED
CARBON
SLURRY

CELLMET FOAM (TM)    100 μm

CONVENTIONAL ELECTRODE
CONSTRUCTION

FOAM-BASED-ELECTRODE
CONSTRUCTION

ACTIVE MATERIAL + BINDER
+ CONDUCTIVE MATERIAL

ACTIVE MATERIAL

CURRENT COLLECTOR

CURRENT COLLECTOR

TRADITIONAL DESIGN
ACTIVE ELECTRODE MATERIAL
WITH LOW CONDUCTIVITY
LESS ACTIVE ZONE
HIGHLY ACTIVE ZONE
CURRENT COLLECTOR
FIG. 3A
ACTIVE ELECTRODE MATERIAL
WITH HIGH CONDUCTIVITY
HIGHLY ACTIVE ZONE
CURRENT COLLECTOR
FIG. 3B
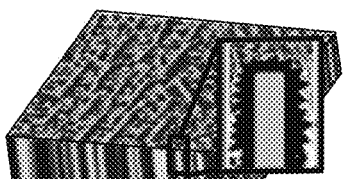
— COBALT OXIDE (ANODE)
═ COBALT (CURRENT COLLECTOR)
FIG. 3C
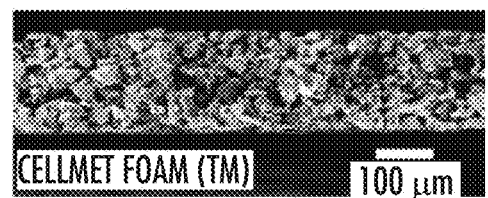
CELLMET FOAM (TM)     100 μm
FIG. 3D

METAL FOAM CAPACITORS AND SUPERCAPACITORS

CROSS-REFERENCE TO RELATED APPLICATIONS

This patent application claims the benefit of U.S. patent application 62/823,595, filed Mar. 25, 2019, which is incorporated by reference along with all other references cited in this application.

BACKGROUND OF THE INVENTION

This invention relates to electronic components, and more specifically, high-power energy storage devices, more specifically, metal foam capacitors and supercapacitors.

Over the past few decades, there has been higher demand for the development of alternative energy conversion and storage systems due to the increasing consumption of fossil fuel, greater concerns about the global environment, and a big push for higher quality electronic consumer products.

Therefore, there is a need for improved electronic components, especially metal foam capacitors.

BRIEF SUMMARY OF THE INVENTION

A capacitor and supercapacitor design are based on metal-foam electrodes. An electrolytic capacitor has a metal foam dielectric (e.g., aluminum oxide, titanium oxide, iron oxide, or others). An electric double-layer supercapacitor has an electrode with metal foam (e.g., copper, nickel, titanium, iron, steel alloy, or aluminum) filled with activated carbon, or graphene, or metal foam with activated carbon foam, or any combination of these to enhance the electrical conductivity and thus the power and capacity of the cell. A pseudocapacitor device has an electrode with metal foam (e.g., iron, cobalt, nickel, copper, titanium, aluminum, magnesium, tin, manganese, and stainless steel, and their alloy foams) coated with an oxide- or hydroxide-based material containing highly active zones. The pseudocapacitor metal-foam electrode can also be filled with activated carbon in the form of a slurry to further enhance its capacity.

An electrolytic capacitor contains metal foam, with a metal-oxide coating dielectric (e.g., aluminum oxide, titanium oxide, iron oxide, or others) on the surface of the metal foam, as opposed to conventional rolled metal foil with a metal-oxide coating on the surface of the metal foil.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 1A-1C shows examples of traditional electrolytic capacitors.

FIGS. 3A-3D shows pseudocapacitor designs including a pseudocapacitor with metal-foam electrodes.

DETAILED DESCRIPTION OF THE INVENTION

Figure 1C:
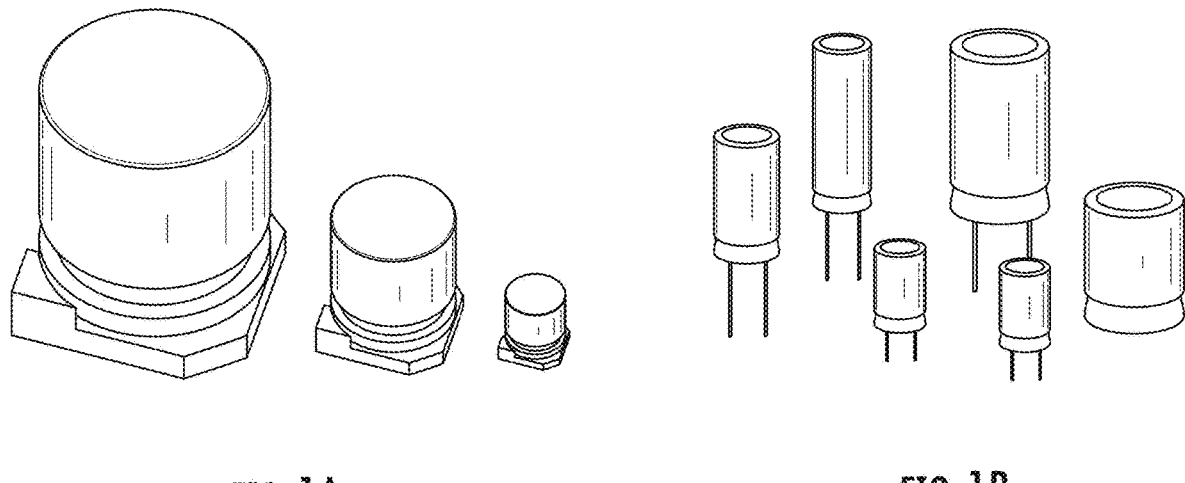
Figure 1C:
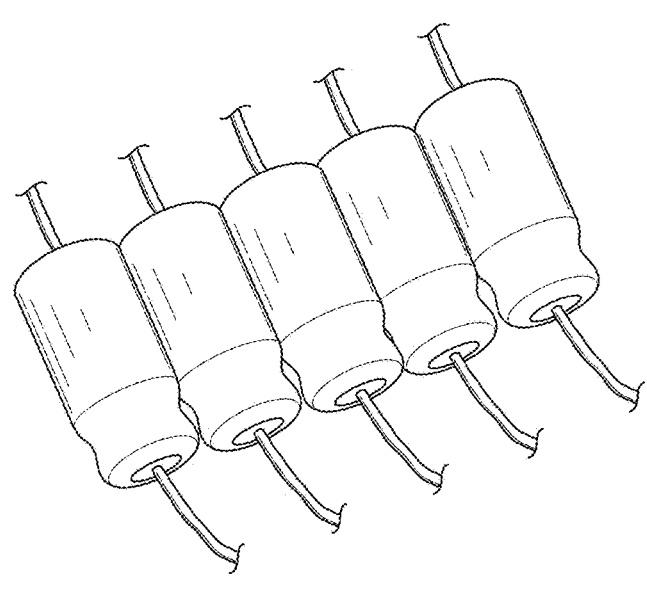

There has been higher demand for the development of alternative energy conversion and storage systems due to the increasing consumption of fossil fuel, greater concerns about the global environment, and a big push for higher quality electronic consumer products.

This has led to the development of more advanced energy storage systems, including lithium-ion batteries (LIBs), capacitors, and supercapacitors (SCs). In particular, capacitors and supercapacitors can be used as a replacement for batteries or in combination with them to further improve their energy storage and power capability because existing batteries generally suffer from relatively low power characteristics (e.g., slow charging or discharging) compared with capacitors and supercapacitors.

Supercapacitors possess excellent power density, a rapid charging or discharging rate (within about 3 seconds), a long cyclic life, and greater safety than traditional lithium-ion batteries, despite their relatively low energy density.

By considering the benefits of supercapacitors and overcoming their present issues, the main focus of this invention is to improve the specific energy density of supercapacitors using the design of a metal-foam electrode with a greater surface area and electrical conductivity. These supercapacitors include electric double-layer capacitors (EDLCs) and pseudocapacitors.

The electric double-layer capacitor has an electrode with metal foam filled with activated carbon, metal foam coated with graphene, or foam made of activated carbon or any combination of these. In an electric double-layer capacitor, capacitance is related to the accumulation of charge within the double layer between the electrode and electrolyte interface via non-faradaic processes. During the charging process, electrons move from the anode to the cathode and positive charge in the electrolyte accumulates, leading to the formation of a Helmholtz double layer between the electrode and electrolyte. On the other hand, during the discharging process, holes and negative charges in the electrolyte accumulate to create a flow of current.

The pseudocapacitor has an active oxide material coated onto the metal-foam electrode, leading to highly active zones with a higher surface area. In particular, the active material coated onto the metal-foam electrode is a metal oxide, a metal hydroxide, or a combination of these. Additionally, it is possible to mix activated carbon with the metal oxide or metal hydroxide active material or to add an active carbon coating to further enhance the EDLC reaction.

In an implementation, an active metal oxide or metal hydroxide coating is added to a metal-foam electrode with pores ranging from several tens of nanometers to several tens of microns to provide a high surface area. The highly active metal oxide is formed on the metal-foam electrode using a simple thermal oxidation process. The porous structure of the metal-foam electrode can then lead to greater capacitance and power density due to the enhanced contact between the aqueous or organic electrolyte and the metal-oxide layer on the metal-foam electrode.

Additionally, a pseudocapacitor design is has two electrodes composed of two different open-cell metal foams (to achieve a cell voltage comparable to or greater than 1.0 volts) such that one metal-foam electrode reacts with the cations and the other metal-foam electrode reacts with the anions. This asymmetric cell structure can produce a wide voltage window and a high-power density. Furthermore, a hybrid cell design in which the metal-foam electrodes are combined with activated carbon material is feasible.

Some methods for the formation of the oxide and hydroxide layer on the metal-foam electrode include simple thermal oxidation, electrochemical oxidation, and mechanical oxidation through such means as thermal heat treatment in an air environment, electroplating, electroless plating, anodizing, sol-gel processing, and others. Some high-capacitance metal-oxide coatings (e.g., ruthenium (IV) oxide, titanium oxide, copper oxide, iron oxide, nickel oxide, manganese oxide, an others) can be grown on the metal-foam electrode surface using the abovementioned methods.

FIGS. 1A-1C show examples of traditional electrolytic capacitors form factors and lead styles. Electrolytic capacitors in existing standard form factors can incorporate metal foams. For example, the form factors can include cylindrical, oval, round, and rectangular, in both axial and radial style leads. Specifically, the metal film of electrolytic capacitors are manufactured using a metal foam.

Electrolytic capacitors have some of the highest capacitance values of any type of capacitor. Electrolytic capacitors are constructed with thin metallic films and an electrolytic semi-liquid solution. The flexibility of these materials allows them to be rolled up and provide a large surface area and therefore help to create a large capacitance. Since the electrolytic solution is conductive and used as the second electrode in an electrolytic capacitor, a thin dielectric oxide layer is grown on the metallic film, to prevent the metallic film from shorting to the electrolytic solution. The dielectric film is very thin which greatly increases the capacitance of an electrolytic capacitor.

Electrolytic capacitors do come with some limitations—polarization and voltage ratings. A downside of electrolytic capacitors is that most of them are polarized and care must be taken to ensure they are used correctly. Placing an electrolytic capacitor backward will result in very rapid destruction of the capacitor, often violently with the potential to cause damage to anything nearby. All polarized electrolytic capacitors have their polarity marked on them with a negative sign that indicates which pin must be kept at the lowest electrical potential. The voltage rating of most electrolytic capacitors is low, but they can be found with voltage ratings up to several hundred volts.

Two of the most common types of electrolytic capacitors are aluminum electrolytic capacitors and tantalum capacitors. Tantalum capacitors differ from most electrolytic capacitors in that they look more like ceramic capacitors. Unlike ceramic capacitors, tantalum capacitors are polarized. However, tantalum capacitors are much more resilient for reversed polarities than aluminum electrolytic capacitors and are sometimes placed in series with both negative terminals connected to form a "non-polarized" tantalum capacitor. Tantalum capacitors are much smaller than aluminum electrolytic capacitors and have lower leakage currents which make them a better choice for many signal blocking, by-passing, decoupling, filtering, and timing applications.

Figures 1D, 1E, 1F:
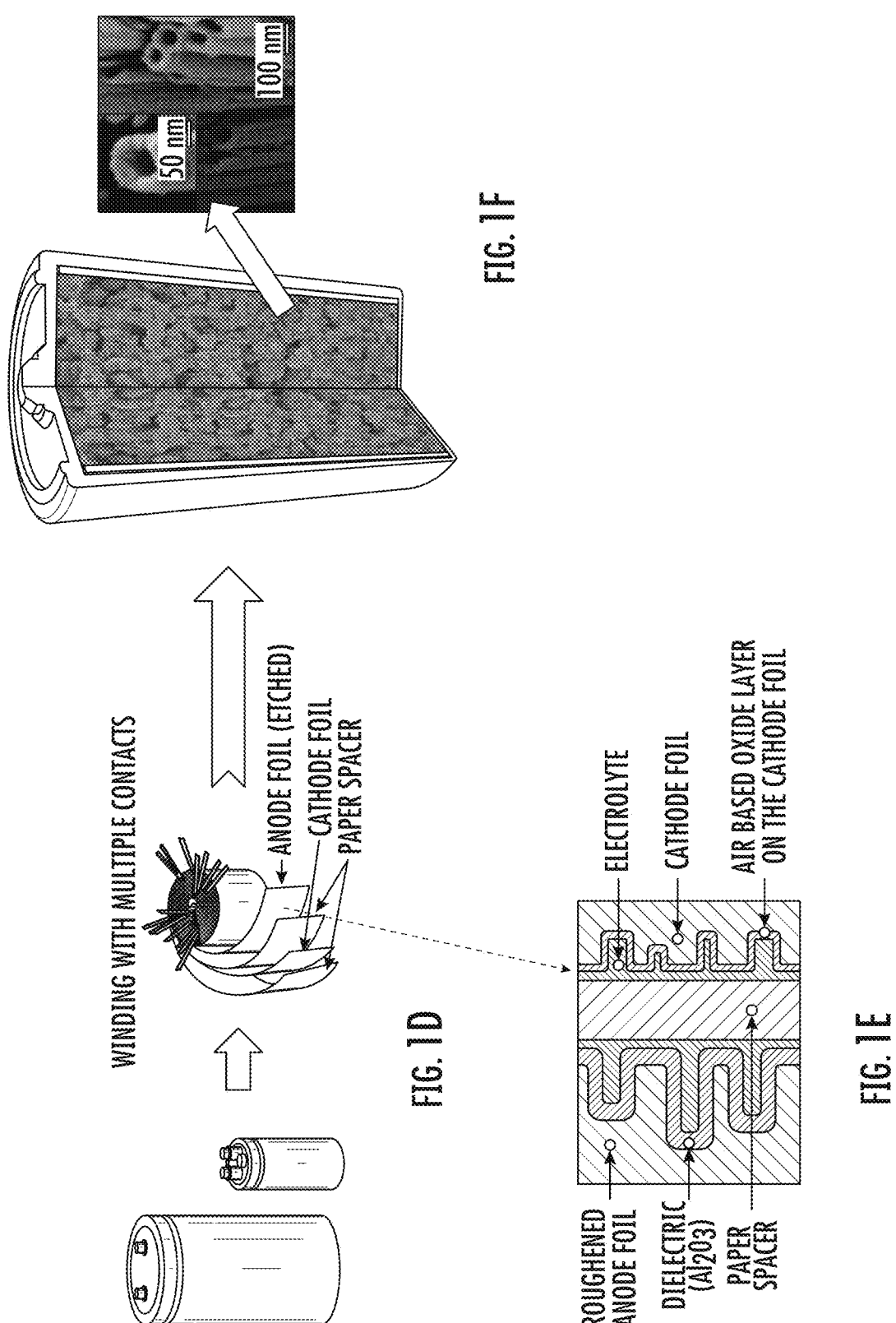
FIG. 1D shows a traditional electrolytic capacitor using layer-by-layer thin foil.
FIG. 1E shows a cross-section of an electrolytic capacitor design.
FIG. 1F shows an electrolytic capacitor design based on cylindrically shaped metal foam coated with a metal-oxide layer.

FIG. 1D shows an electrolytic capacitor using layer-by-layer thin foil. There is a winding with multiple contacts.

There is anode foil and cathode foil, which are separated by a paper spacer. The anode foil can be etched.

FIG. 1E shows a cross-section of an electrolytic capacitor design. This is roughened anode foil, a dielectric (e.g., aluminum oxide), a paper spacer, an electrolyte, cathode foil, and an oxide layer on the cathode foil.

FIG. 1F shows a metal-foam-based electrolytic capacitor with a cylindrically shaped metal-foam anode. In the electrolytic metal-foam capacitor, cylindrically shaped metal foam (e.g., aluminum) is used instead of a layer-by-layer foil structure; here, the metal foam is coated with a metal-oxide layer, which can be grown easily using thermal heat treatment or an anodizing process. This can improve performance due to the large surface area of the metal foam and lower manufacturing costs.

In particular, to produce an efficient electrolytic metal-foam capacitor, the metal foam can be anodized; here, examples of metal foams include aluminum, tantalum, titanium, cobalt, nickel, or copper. After anodizing the surface, aluminum oxide, tantalum oxide, titanium oxide, iron oxide, or other oxides are formed. The cathode, spacer, and electrolyte are essentially the same as those used in traditional electrolytic capacitors, including a conventional electrolyte, cathode aluminum foil, and a paper spacer.

Figure 2A:
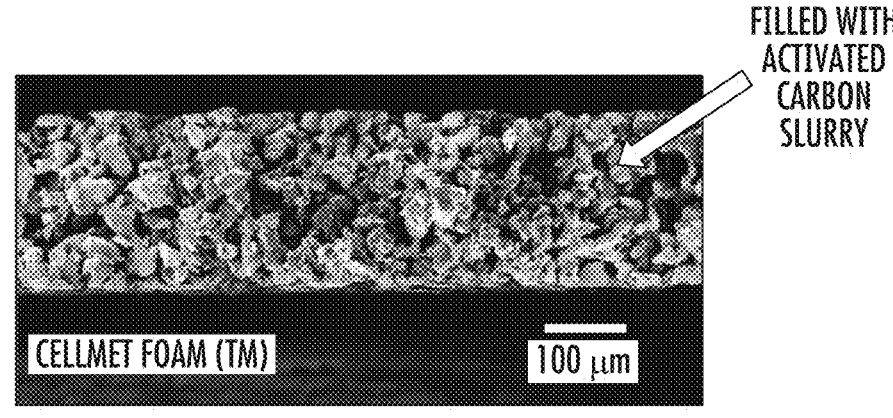
FIG. 2A shows an electric double-layer supercapacitor design containing two identical metal-foam electrodes filled with activated carbon material.

FIG. 2A shows an electric double-layer supercapacitor with metal-foam electrodes for the double electric layer. In a first implementation, the metal foam is filled with activated carbon, which improves electrical conductivity and allows for a greater reaction depth. Some examples of metal foams used for electric double-layer supercapacitors include copper, titanium, aluminum, iron, cobalt, and nickel, as well as other metal foams. CELLMET FOAM™ is a metal foam and is a trademark of CellMobility, Inc.

In a second implementation of the electric double-layer supercapacitor, the metal foam is coated with graphene, which improves conductivity and provides a larger surface area. In a third implementation, the foam electrode is fabricated using activated carbon (e.g., activated carbon foam), which provides an enhanced surface area and greater reaction depth.

Figures 2B, 2C:
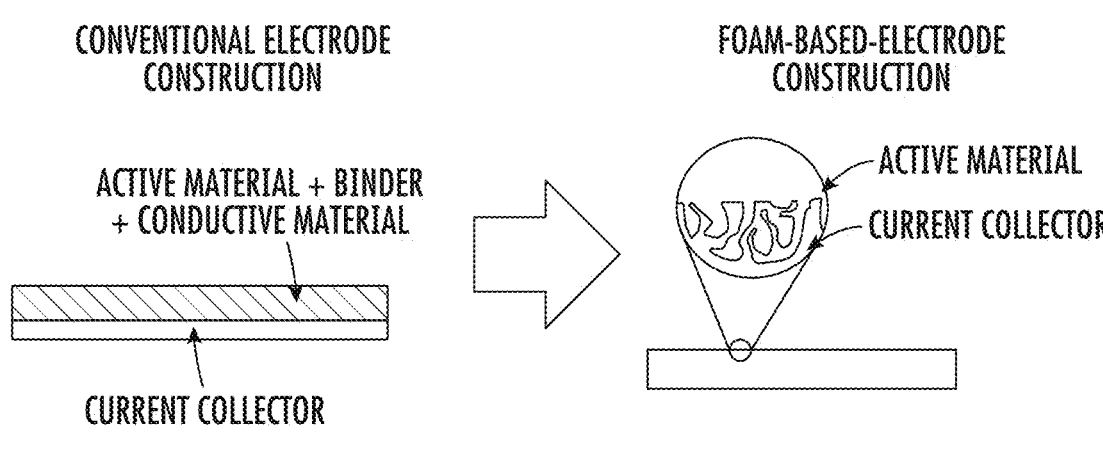
FIG. 2B shows a construction of an electrolytic capacitor.
FIG. 2C shows a construction of an electrolytic capacitor with foam active material.

FIG. 2B shows a construction of a conventional electrode as a layer of active material (e.g., relatively uniform film) plus binder plus conductive material and a current collector layer.

FIG. 2C shows a construction of a foam-based-electrode has a foam active material (e.g., with a porous three-dimensional structure with open areas that increase metal surface area) and current collector below the active material. Because of the porous structure, the foam-based-electrode has much greater surface area.

FIG. 3A-3B show pseudocapacitor designs. A pseudocapacitor has two different metal-foam electrodes as the anode and cathode. FIG. 3A shows a conventional pseudocapacitor design with an active electrode material and relatively low conductivity. FIG. 3B shows a pseudocapacitor design with an active electrode metal-foam material and relatively high conductivity.

FIGS. 3C-3D shows more detail of an implementation of a metal-foam pseudocapacitor. An oxide layer (e.g., cobalt oxide anode) is grown on the metal-foam electrode (e.g., cobalt current collector), which leads to a greater reaction depth, a larger surface area, higher conductivity, and less costly processing. Some examples of metal foams for pseudocapacitors include titanium, cobalt, copper, nickel, iron, and manganese, as well as others; here, different combinations of metal-foam electrodes can be used to achieve a decent cell voltage range between the two electrodes. While traditional slurry-based active electrode materials exhibit low conductivity, active electrode materials with a metal-oxide coating (e.g., metal oxide thermally grown on metal foam) have considerably higher conductivity. CELLMET FOAM™ is a metal foam and is a trademark of CellMobility, Inc.

Figure 4:
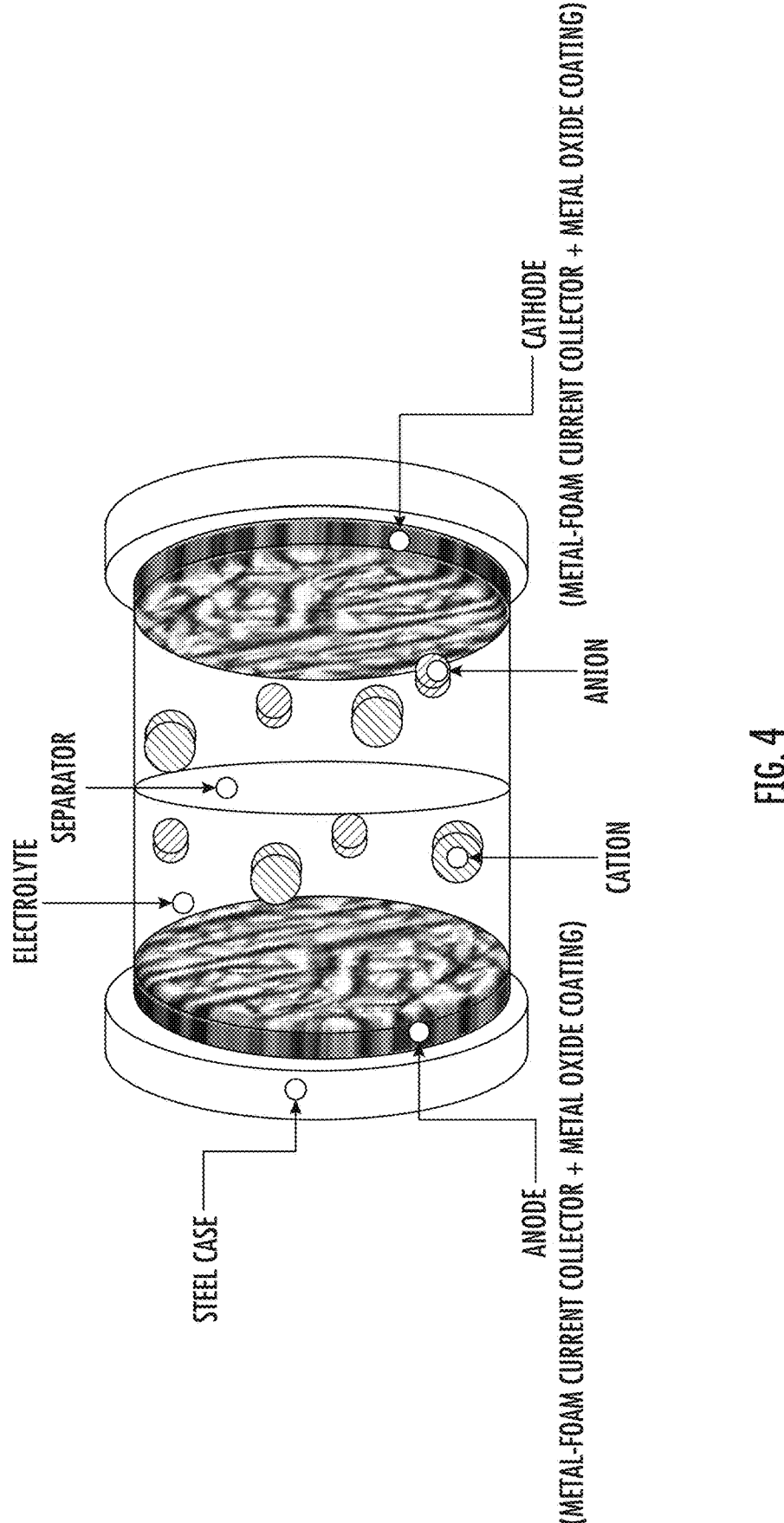
FIG. 4 shows a coin-cell pseudocapacitor design using metal-foam electrodes coated with a metal-oxide layer.

FIG. 4 shows an example of a coin-cell pseudocapacitor in which two metal-foam electrodes are assembled with a conventional electrolyte and separator. The coin-cell pseudocapacitor is a sandwich-structure where two steel cases are the outermost layers. On a first side of the structure is an anode (e.g., metal-foam current collector and metal oxide costing). On a second side is a cathode (e.g., metal-foam current collector and metal oxide costing). Between the anode and cathode is an electrolyte and a separator, which separates the two sides. There are cations in the electrolyte on the first side, and anions in the electrolyte on the second side.

The present invention also relates to a method of fabricating a metal-foam-structured electrode for use as an electrode in a capacitor or supercapacitor. The method includes the steps for fabricating a porous metal foam with pore sizes ranging from submicron dimensions to several hundred microns for use as the fundamental platform for the current collector and for forming an active material such as a metal oxide or a metal hydroxide on the surface of the metal-foam electrode.

The metal-foam electrode can be manufactured using a variety of methods, including freeze casting, dealloying, space-holder processing, electroless plating, electroplating, and others. As an example of the freeze-casting method, the manufacturing of a metal-foam electrode includes (a) freezing the metal (or metal oxide) slurry in a mold; (b) sublimating the frozen slurry under reduced pressure and low temperature, to form a metal-foam green body; (c) sintering the metal-foam green body to achieve a three-dimensionally connected metal foam with decent strength; (d) cutting the porous metal foam into a thin film; (e) opening the surface pore structure; and (f) coating the porous metal foam with an active material, e.g., the thermal growth of a thin metal-oxide layer.

While three embodiments are presented as examples for the manufacture of pseudocapacitor metal-foam electrodes (e.g., cobalt foam, titanium foam, and copper foam electrodes with oxide or hydroxide layers formed on their surface), the choice of metallic foam is not limited to these but is open to other metallic materials, such as copper, nickel, and others depending on the cell voltage generated between the two electrodes.

This application describes some examples of implementations with specific dimensions, measurements, and values. These are not intended to be exhaustive or to limit the invention to the precise form described. The values, percentages, times, and temperatures are approximate values. These values can vary due to, for example, measurement or manufacturing variations or tolerances or other factors. For example, depending on the tightness of the manufacturing and measurement tolerances, the values can vary plus or minus 5 percent, plus or minus 10 percent, plus or minus 15 percent, or plus or minus 20 percent.

Further, the values are for a specific implementation, and other implementations can have different values, such as certain values made larger for a larger-scaled sized process or product, or smaller for a smaller-scaled product. A device, apparatus, or process may be made proportionally larger or smaller by adjusting relative measurements proportionally (e.g., maintaining the same or about the same ratio between different measurements). In various implementations, the values can be the same as the value given, about the same of the value given, at least or greater than the value given, or can be at most or less than the value given, or any combination of these.

Exemplary Embodiment 1: Copper foam is selected as a model material for the demonstration of this invention and is fabricated using freeze-casting or dealloying. For the freeze-casting method, a metal slurry is prepared by mixing copper oxide powder with deionized water and a binder. The copper oxide powder is well dispersed in the slurry with a combination of stirring and sonication. The slurry is then poured into a Teflon mold onto the copper rod, which is cooled using liquid nitrogen. The temperature of the top of the copper rod is controlled using a heater and is fixed at −15 degrees Celsius. After freezing, the frozen slurry is dried at −90 degrees Celsius for about 24 hours, forming a porous green-body copper foam. The green-body copper foam is reduced and sintered in a tube furnace in a hydrogen-95-percent-argon-gas mixture. The reduction and sintering process is conducted step-by-step at 250 degrees Celsius for about 4 hours and then at about 800 degrees Celsius for about 14 hours.

To create a hydroxide layer on the manufactured copper foam electrode, a solution is prepared by mixing sodium hydroxide and ammonium persulfate with deionized water at room temperature; subsequently, the prepared copper foam is immersed in this solution for about 20 minutes. After the hydroxide process, the copper-foam electrode is subjected to heat treatment in an air furnace. The copper hydroxide is then transformed into copper oxide at about 180 degrees Celsius for about 2 hours.

Alternatively, the prepared copper-foam electrode can be thermally oxidized to produce a copper-oxide layer. In this case, the prepared copper-foam electrode is heat-treated at about 400 degrees Celsius for about 30 minutes in an air atmosphere.

Exemplary Embodiment 2: Titanium foam is selected as a model material in this embodiment and is fabricated using a freeze-casting process. Prior to freezing, poly(vinyl alcohol) is dissolved in distilled water, and titanium powder is added to the prepared solution to complete the slurry. The slurry is then poured directly onto the top of a copper chiller rod standing in a vessel under liquid nitrogen. The frozen green-body titanium foam is subsequently lyophilized to remove ice through sublimation at subzero temperatures for about 24 hours. The lyophilized green-body titanium foam is then sintered in a furnace.

To form the active material coating on the surface of the titanium foam, an anatase-phase oxide coating is preferred; the anatase titanium oxide coating layer then reacts with the cations in the electrolyte. The prepared titanium foam is pre-soaked in a mixed solution of hydrogen peroxide ($H_2O_2$) and hydrochloride at about 70 degrees Celsius for about 3 hours. The presoaked titanium foam is then oxidized in an air furnace at about 400 degrees Celsius for about 30 minutes.

Exemplary Embodiment 3: Cobalt powder slurry is prepared with 30 mL of deionized water containing 7 volume-percent cobalt oxide powder and 8 weight-percent polyvinyl alcohol (PVA) binder. The slurry is uniformly prepared using a combination of stirring and sonication to aid in dispersion. The slurry is then poured into a Teflon or polytetrafluoroethylene (PTFE) mold placed on a copper rod. The temperature of the top of the copper rod is fixed at about −10 degrees Celsius using liquid nitrogen. After the slurry is completely frozen, the frozen sample is sublimated at −88 degrees Celsius for about 24 hours in a freeze-dryer in a vacuum, resulting in the removal of ice crystals and the formation of green-body cobalt foam with directional pores. The green-body cobalt foam is then reduced from cobalt oxide to cobalt in a hydrogen atmosphere and sintered. The reduction and sintering processes consist of pre-sintering at about 550 degrees Celsius for about 4 hours and actual sintering at about 1000 degrees Celsius for about 9 hours in a tube furnace.

To form the hydroxide layer on the prepared cobalt foam, a solution is prepared by mixing cobalt(II) chloride and urea with deionized water at about 90 degrees Celsius. Subsequently, the cobalt foam is immersed in the solution for about 2 hours. After the hydroxide process on the surface of the cobalt foam, the foam sample is subjected to heat treatment in air. The transformation of cobalt hydroxide to cobalt oxide takes place at about 300 degrees Celsius for about 2 hours. Alternatively, simple thermal heat treatment can also be applied to produce a cobalt oxidation layer on the prepared cobalt foam at about 600 degrees Celsius for about 30 minutes in an air atmosphere.

In an implementation, a metal-foam-based capacitor device includes a metal-foam anode electrode coated with a metal-oxide layer on the surface. The metal foam is at least one of aluminum, titanium, cobalt, nickel, copper, or iron. The metal-oxide coating is formed via a thermal oxidation or anodizing process.

In an implementation, a metal-foam-based electric double-layer supercapacitor cell device includes two metal-foam electrodes filled with active material in the volumetric weight range of 0.2-1.8 gram per cubic centimeter. The metal-foam electrode is at least one of copper, nickel, titanium, iron, steel alloy, or aluminum with a porosity range between 60 percent to 90 percent. The copper foam electrode is coated with tin (Sn) via an electroless plating. The active material is added in the form of a slurry mixture with deionized water and a binder. The active material filler is activated carbon or graphene in combination with a conventional electrolyte and separator.

In an implementation, metal-foam-based pseudocapacitor cell device includes two metal-foam electrodes coated or filled with active materials, or a combination. The two metal-foam electrodes can be any one of or a combination of iron, cobalt, nickel, copper, titanium, aluminum, magnesium, tin, manganese, or stainless steel metal foams and their alloys with a porosity range from about 60 percent to 90 percent.

The metal-foam electrode can be coated with an active coating layer with a thickness of between about 10 nanometers and about 500 nanometers via chemical or thermal oxidation. The anode and cathode active materials can be a different combination of oxide- or hydroxide-based materials, or any combination, including at least one of Fe2O3, Fe3O4, FeOOH, MnO2, Mn3O4, Co3O4, CoO, SnO2, Cu2O, Cu(OH)2 CuO, TiO2, NiO, or Ni(OH)2.

The oxide coating can be formed via thermal heat treatment at a temperature range of about 100 degrees Celsius to 800 degrees Celsius for a duration of from about 5 minutes to about 3 hours in an air atmosphere. Activated carbon can be added in the form of a slurry mixture with deionized water and a binder in a volumetric weight range of 0.2-1.8 grams per centimeter. The metal-foam electrode can be manufactured using at least one of freeze-casting, three-dimensional (3D) printing, the space-holder technique, or dealloying processing.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A metal-foam-based capacitor device comprising:
a single-layer metal-foam anode electrode filled with an active material in a volumetric weight range of 0.2-1.8 grams per cubic centimeter and coated with a thermal metal-oxide layer on a surface of the electrode, wherein the capacitor device comprises an electric double-layer capacitor, and the active material wholly in a single layer.

2. The device of claim 1 wherein the metal foam is at least one of aluminum, tantalum, titanium, cobalt, nickel, copper, or iron.

3. The device of claim 1 wherein the thermal metal-oxide coating is formed via a thermal oxidation.

4. The device of claim 1 wherein the metal-foam anode electrode is manufactured using freeze-casting.

5. The device of claim 1 wherein the metal-foam anode electrode is formed using
thermal heat treatment at a temperature range of about 100 degrees Celsius to 800 degrees Celsius for a duration of from about 5 minutes to about 3 hours in an air atmosphere,
activated carbon is added in the form of a slurry mixture with deionized water and a binder in a volumetric weight range of 0.2-1.8 grams per centimeter, and
freeze-casting.

6. A metal-foam-based electric double-layer supercapacitor cell device comprising:
two metal-foam electrodes filled with an active material in a volumetric weight range of 0.2-1.8 grams per cubic centimeter, wherein each of the two metal-foam electrodes comprises a metal foam and the active material wholly in a single layer,
the metal-foam electrodes comprise at least one electrode comprising a copper foam coated with tin.

7. The device of claim 6 wherein at least one metal-foam electrode is at least one of nickel, titanium, iron, or steel alloy with a porosity range between 60 percent to 90 percent.

8. The device of claim 7 wherein electroless plating is used to coat the copper foam electrode with tin (Sn).

9. The device of claim 6 wherein the active material is added in the form of a slurry mixture with deionized water and a binder.

10. The device of claim 6 wherein the active material filler is activated carbon or graphene in combination with a conventional electrolyte and separator.

11. The device of claim 6 wherein the two metal-foam electrodes are manufactured using freeze-casting.

12. The device of claim 6 wherein at least one of the two metal-foam electrodes are manufactured using
thermal heat treatment at a temperature range of about 100 degrees Celsius to 800 degrees Celsius for a duration of from about 5 minutes to about 3 hours in an air atmosphere,
activated carbon is added in the form of a slurry mixture with deionized water and a binder in a volumetric weight range of 0.2-1.8 grams per centimeter, and
freeze-casting.

13. A metal-foam-based electrostatic capacitor cell device comprising:

two metal-foam electrodes coated or filled with an active material, or a combination in a volumetric weight range of 0.2-1.8 grams per cubic centimeter, wherein each of the two metal-foam electrodes comprises a metal foam and the active material wholly in a single layer, and the metal-foam electrodes are coated with an active thermal coating layer with a thickness of between about 10 nanometers and about 500 nanometers via thermal oxidation.

14. The device of claim 13 wherein the two metal-foam electrodes can be any one of or a combination of iron, cobalt, nickel, copper, titanium, aluminum, magnesium, tin, manganese, or stainless steel metal foams and their alloys with a porosity range from about 60 percent to 90 percent.

15. The device of claim 13 wherein the anode and cathode active materials are a different combination of oxide- or hydroxide-based materials, or any combination, including at least one of $Fe_2O_3$, $Fe_3O_4$, FeOOH, $MnO_2$, $Mn_3O_4$, $Co_3O_4$, CoO, $SnO_2$, $Cu_2O$, $Cu(OH)_2$ CuO, $TiO_2$, NiO, or $Ni(OH)_2$.

16. The device of claim 15 wherein the oxide coating is formed via thermal heat treatment at a temperature range of about 100 degrees Celsius to 800 degrees Celsius for a duration of from about 5 minutes to about 3 hours in an air atmosphere.

17. The device of claim 13 wherein activated carbon is added in the form of a slurry mixture with deionized water and a binder in a volumetric weight range of 0.2-1.8 grams per centimeter.

18. The device of claim 13 wherein the metal-foam electrode is manufactured using at least one of freeze-casting, 3D printing, the space-holder technique, or dealloying processing.

19. The device of claim 13 wherein the metal-foam electrode is formed using thermal heat treatment at a temperature range of about 100 degrees Celsius to 800 degrees Celsius for a duration of from about 5 minutes to about 3 hours in an air atmosphere, activated carbon is added in the form of a slurry mixture with deionized water and a binder in a volumetric weight range of 0.2-1.8 grams per centimeter, and freeze-casting.

* * * * *